(12) United States Patent
Park et al.

(10) Patent No.: US 8,013,568 B2
(45) Date of Patent: Sep. 6, 2011

(54) CONTACT-LESS CHARGEABLE BATTERY AND CHARGING DEVICE, BATTERY CHARGING SET, AND CHARGING CONTROL METHOD THEREOF

(75) Inventors: Dong-Young Park, Seoul (KR); Sung-Wook Moon, Seoul (KR); Sung-Wook Choi, Anyang-si (KR); Gwang-Hee Gwon, Anyang-si (KR); Sub Han, Yongin-si (KR); Jung-Bum Kim, Anyang-si (KR)

(73) Assignee: LS Cable & System Ltd., Anyang, Gyeonggi-do (KR)

( * ) Notice: Subject to any disclaimer, the term of this patent is extended or adjusted under 35 U.S.C. 154(b) by 750 days.

(21) Appl. No.: 11/997,272

(22) PCT Filed: May 8, 2006

(86) PCT No.: PCT/KR2006/001713
§ 371 (c)(1),
(2), (4) Date: Jun. 17, 2008

(87) PCT Pub. No.: WO2007/013726
PCT Pub. Date: Feb. 1, 2007

(65) Prior Publication Data
US 2008/0303479 A1  Dec. 11, 2008

(30) Foreign Application Priority Data

Jul. 29, 2005 (KR) .......... 10-2005-0069871
Apr. 28, 2006 (KR) .......... 10-2006-0038960

(51) Int. Cl.
*H02J 7/00* (2006.01)
*H02J 7/04* (2006.01)
*H02M 7/5383* (2007.01)

(52) U.S. Cl. ........ 320/108; 320/109; 320/134; 320/136; 320/139; 363/74; 363/84

(58) Field of Classification Search .......... 320/108
See application file for complete search history.

(56) References Cited

U.S. PATENT DOCUMENTS 6,005,304 A * 12/1999 Seelig .......... 307/104
6,184,651 B1 * 2/2001 Fernandez et al. ....... 320/108
(Continued)

FOREIGN PATENT DOCUMENTS

| JP | 07-039077 A | 2/1995 |
| JP | 7-170668 | 7/1995 |
| JP | 2002-315209 A | 10/2002 |

(Continued)

OTHER PUBLICATIONS

International Search Report, dated Aug. 22, 2006, issued in International Application No. PCT/KR2006/001713.

*Primary Examiner* — Edward Tso
*Assistant Examiner* — Yalkew Fantu
(74) *Attorney, Agent, or Firm* — Sherr & Vaughn, PLLC (57) ABSTRACT

The present invention relates to a wireless charger for a mobile communication terminal, which allows charging a plurality of batteries in a conveniently way without any terminal connection of the batteries to chargers for various mobile communication terminals such as a cellular phone and PDA and also allows intercepting electromagnetic waves while the charger is used, by means of Faraday's law.

The wireless charger of the present invention includes a charger body having an electromagnetic wave intercepting means; a charging pad received in the charger body; and at least one battery that is to be charged by means of induced electromotive force generated by the charging pad, wherein the charger body includes a power supply means, a housing having a receiver for receiving the charging pad and connected to the power supply means, and a cover hinged to the housing.

24 Claims, 5 Drawing Sheets

U.S. PATENT DOCUMENTS

| | | | |
|---|---|---|---|
| 6,683,438 B2 * | 1/2004 | Park et al. | 320/108 |
| 7,208,915 B2 * | 4/2007 | Kubota et al. | 320/134 |
| 2002/0089305 A1 * | 7/2002 | Park et al. | 320/108 |
| 2005/0189910 A1 * | 9/2005 | Hui | 320/108 |

FOREIGN PATENT DOCUMENTS

| | | |
|---|---|---|
| KR | 20-0139614 | 5/1999 |
| KR | 10-2001-0074181 A | 8/2001 |
| KR | 20-0411082 | 3/2006 |

* cited by examiner

CONTACT-LESS CHARGEABLE BATTERY AND CHARGING DEVICE, BATTERY CHARGING SET, AND CHARGING CONTROL METHOD THEREOF

CROSS-REFERENCE TO RELATED APPLICATIONS

This application is a national stage application under 35 U.S.C. 371 based on and claiming the benefit of International Application Serial No. PCT/KR2006/001713 filed on May 8, 2006 and the benefit of priority from Korean Application No. 10-2005-69871 filed on Jul. 29, 2005 and Korean Application No. 10-2006-38960 filed on Apr. 28, 2006, the entire contents of each of which are incorporated herein by reference.

TECHNICAL FIELD

The present invention relates to a contact-less chargeable battery and a charging device using electromagnetic induction phenomenon, and its charging control method, and more particularly to a contact-less chargeable battery capable of solving an overvoltage state by means of a wireless feedback control though an overvoltage is applied to both ends of a circuit part that supplies a constant voltage or a constant current when charging a battery, a contact-less charging device for charging the battery, a battery charging set including them, and a charging control method thereof.

BACKGROUND ART

A personal portable device such as a cellular phone and a notebook is supplied with power through a chargeable battery. If a voltage of the battery is lowered than a pre-determined level, a user of the personal portable device charges the battery using a charging device and then uses the portable device again.

A battery of a general personal portable device has a contact terminal exposed out so that it may be electrically connected to a charging terminal prepared to a charging device. When charging the battery, the charging terminal of the charging device and the contact terminal of the battery are connected with each other and keep their electrically connected state.

However, since the charging terminal and the contact terminal are exposed out for their connection, they are easily contaminated by impurities and also easily worn away due to frictions between both terminals when the charging terminal and the contact terminal are connected. In addition, the charging terminal and the contact terminal easily corrode due to moisture in the art, so a contact between the charging terminal and the contact terminal becomes inferior. Also, if moisture is penetrated into the battery through a fine gap of the contact terminal while using the battery, the battery may be completely discharged due to a short circuit of its internal circuit, which may cause a fatal problem.

In order to solve these problems, a contact-less charging technique capable of charging a battery of a personal portable device while the battery is coupled with a charger in a wireless method by means of electronic induction phenomenon is recently proposed. The contact-less charging technique is currently widely utilized for daily goods such as electric toothbrushes and electric shavers.

Figure 1:
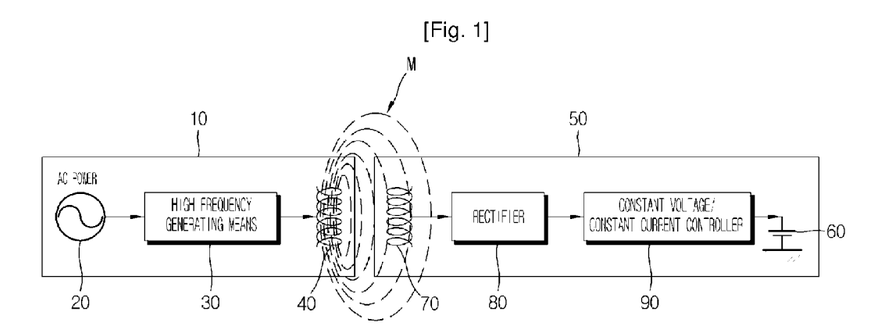
FIG. 1 is a schematic block diagram showing a charging device and a battery adopting a conventional contact-less charging method.

FIG. 1 is a schematic view showing a battery and a charger adopting the conventional contact-less charging method.

Referring to FIG. 1, the charger 10 includes a high frequency power driving means 30 for receiving power from a common AC power source 20 to output a high frequency AC current, and a primary coil 40 supplied with the high frequency AC current from the high frequency power driving means 30 to form a magnetic field M.

In addition, the battery 50 includes a battery cell 60 charged with electric energy, a secondary coil 70 to which a high frequency AC current is induced according to the linkage of the magnetic field M generated in the primary coil 40, a rectifier 80 for converting the high frequency AC current induced in the secondary coil 70 into a DC current, and a constant voltage/constant current supplier 90 for applying the AC current rectified in the rectifier 80 to the battery cell 60.

Here, the constant voltage/constant current supplier 90 is a well-known circuit element widely used in a battery charging device. The constant voltage/constant current supplier 90 plays a role of supplying current to the battery cell 60 constantly at an initial charging stage, and then decreasing supply of current but keeping voltage constantly if a charging voltage of the battery cell 60 slowly increases and then exceeds a certain criterion level.

According to the charger 10 and the battery 50 adopting the contact-less charging method of the prior art, an intensity of the high frequency AC current induced to the secondary coil 70 is proportional to an intensity of the magnetic flux linked to the secondary coil 70. In addition, the intensity of the magnetic flux linked to the secondary coil 70 is changed according to a relative position with the primary coil 40. That is to say, as the secondary coil 70 is positioned closer to the primary coil 40 of the charger 10, an intensity of the magnetic flux linked to the secondary coil 70 is increased, and as a result an intensity of the high frequency AC current induced by the secondary coil 70 is also increased.

Meanwhile, standards of the constant current/constant voltage supplier 90, which is an essential element of a charging circuit module provided to the contact-less chargeable battery 50, are defined according to an intensity of the high frequency AC current induced by the secondary coil 70. However, the intensity of the AC current induced by the secondary coil 70 is changed according to a relative position between the primary coil 40 and the secondary coil 70 as mentioned above.

Thus, if standards of the constant current/constant voltage supplier 90 are defined using a small high frequency AC current, in case the battery 50 is positioned at a position where a large high frequency AC current is induced, overvoltage exceeding the standards may be applied to both ends of the constant current/constant voltage supplier 90 while charging the battery 10, thereby possibly causing a damage on parts.

Considering the above, the charger 10 and the battery 50 adopting the contact-less charging method of the prior art generally employs a structure capable of relatively fixing positions between them at a position where the standards of the constant current/constant voltage supplier 90 are defined.

Figure 2:
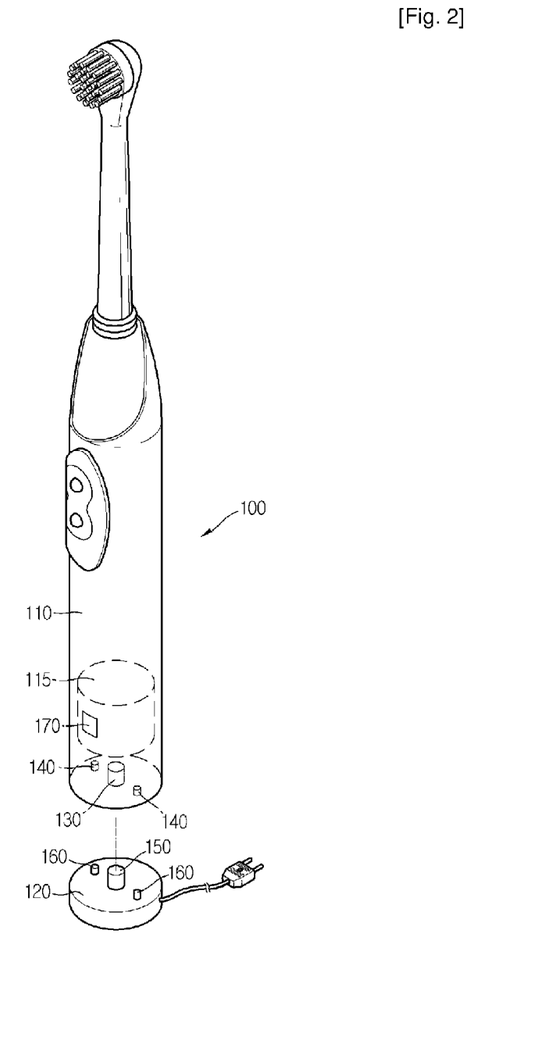
FIG. 2 is a perspective view showing a coupling state of an electric toothbrush adopting the conventional contact-less charging method.

FIG. 2 is a perspective view showing a coupling state of an electric toothbrush 100 adopting the conventional contact-less charging method.

Referring to FIG. 2, the electric toothbrush 100 includes a toothbrush body 110 having a battery 115 mounted to its lower end, and a charger 120 for charging the battery 115 in a contact-less method. A main groove 130 and an auxiliary groove 140 are prepared at a lower end of the toothbrush body 110, and a main protrusion 150 and an auxiliary protrusion 160 are respectively prepared to an upper portion of the charger 120 with shapes to be matched with the main groove 130 and the auxiliary groove 140.

The toothbrush body 110 and the charger 120 are closely fixed with each other by means of matching of the grooves 130, 140 and the protrusions 150, 160, and as a result relative positions of the charger 120 and the battery 150 provided to the toothbrush body 110 are also closely fixed.

Standards of a constant voltage/constant current supplier 170 provided to the battery 115 are defined with the assumption that the toothbrush body 110 and the charger 120 are closely coupled. Thus, an overvoltage exceeding the standards is not applied to both ends of the constant voltage/constant current supplier 170, and as a result it may be prevented that the constant voltage/constant current supplier 170 is damaged due to an unexpected overvoltage.

However, relative positions of the battery 115 and the charger 120 are strictly restricted as mentioned above, any inconvenience may be caused to a user. That is to say, whenever charging the battery 115 provided to the toothbrush body 110, the user should repeatedly struggle for fixing the toothbrush body 110 at a fixed position based on the charger 120. Thus, in order to maximize the convenience of the user, a new technical alternative capable of overcoming the restriction of relative positions of the battery 115 and the charger 120 is needed.

DISCLOSURE OF INVENTION

Technical Problem

The present invention is designed in consideration of the above problems, and therefore it is an object of the invention to provide contact-less chargeable battery and charging device capable of preventing any damage of an internal battery circuit together with solving a restriction for relative positions between the chargeable battery and the charging device when charging the battery in a contact-less charging method, and a battery charging set including them.

Another object of the present invention is to provide a battery charging control method capable of preventing any damage of an internal battery circuit together with solving a restriction for relative positions between the battery and the charger that employ a contact-less charging method.

Technical Solution

In order to accomplish the above object, the present invention provides a contact-less chargeable battery including a charging circuit module for receiving a charging power from an external contact-less charging device by means of electromagnetic induction phenomenon and then charging an electric energy to a battery cell.

Specifically, the charging circuit module includes a high frequency AC current inducing unit to which a high frequency AC current is induced by means of a magnetic field generated from an external contact-less charging device; a rectifier for receiving the induced high frequency AC current and converting the induced high frequency AC current into a DC current; a constant voltage/constant current supplier for receiving the DC current from the rectifier and supplying a charging power to the battery cell in a constant voltage/constant current mode; and an overvoltage monitoring unit for monitoring voltages at both ends of the constant voltage/constant current supplier and transmitting a monitoring result to the external contact-less charging device by means of wireless communication so as to induce a change of intensity of the magnetic field.

In order to accomplish the above object, the present invention provides a contact-less charging device that transmits a charging power to a contact-less chargeable battery by means of electromagnetic induction phenomenon. For this purpose, the charging device includes a magnetic field generating unit for receiving an AC current and forming a magnetic field in an outer space; a high frequency power driving unit for applying a high frequency AC current to the magnetic field generating unit; and a charging power adjusting unit for receiving the monitoring result from the contact-less chargeable battery by means of wireless communication and controlling the high frequency power driving unit to adjust a power of the high frequency AC current applied to the magnetic field generating unit so that a charging power transmitted to the battery is adjusted.

Preferably, the high frequency power driving unit intermittently applies a high frequency AC current to the magnetic field generating unit. In addition, the overvoltage monitoring unit of the battery wirelessly transmits the monitoring result to the charging power adjustment unit while a magnetic field is not generated through the magnetic field generating unit.

Preferably, the monitoring result is a charging power adjustment request signal, a difference of voltages at both ends of the constant voltage/constant current supplier, voltage values at both ends, or a code indicating that the voltages at both ends are in an overvoltage state.

Preferably, the high frequency AC current inducing unit is a coil to which a magnetic flux of a magnetic field generated from the external contact-less charging device is linked, and the magnetic field generating unit is a coil to both ends of which a high frequency AC current is applied.

Preferably, the overvoltage monitoring unit includes a wireless transmitting unit for wirelessly propagating the monitoring result through an antenna; first and second voltage detectors for respectively detecting voltages at front and rear ends of the constant voltage/constant current supplier; a voltage comparator for comparing first and second voltages detected by the first and second voltage detectors and outputs a voltage comparison result; and a microprocessor for outputting a monitoring result according to the voltage comparison result to the wireless transmitting unit.

Preferably, the overvoltage monitoring unit further includes a charging pause detection unit for receiving the high frequency AC current output from the high frequency AC current inducing unit to detect a time point when the induction of high frequency AC current ends, and then outputting the end time point to the micro-processor. In this case, the microprocessor outputs the monitoring result to the wireless transmitting unit after the end time point is input.

Preferably, the charging power adjusting unit includes a wireless receiving unit for wirelessly receiving the monitoring result through an antenna; and a microprocessor for receiving the monitoring result from the wireless receiving unit and controlling the high frequency power driving unit to adjust a power of the high frequency AC current applied to the magnetic field generating unit.

Preferably, the chargeable battery further includes a constant voltage supplier for converting a common AC current, converting the common AC current into a DC current, and then supplying a constant-voltage current to the high frequency power driving unit, and the high frequency power driving unit includes a pulse signal generator for receiving a pulse driving signal from the microprocessor and outputting a pulse signal; and a power driving part for receiving the pulse signal to rapidly switch the constant-voltage current input from the constant voltage supplier, thereby generating a high frequency AC current in a pulse pattern.

Preferably, the charging power adjusting unit adjusts a charging power by modulating a width of a pulse current, a frequency of the pulse current, an amplitude of a pulse, or the number of pulses.

Preferably, the constant voltage supplier includes an overvoltage filter for receiving a common AC current and intercepting an overvoltage current; a rectifier for rectifying the AC current passing through the filter to convert the AC current into a DC current; and a constant voltage supplying part for receiving the converted DC current and outputs a constant voltage current.

In another aspect of the present invention, there is also provided a method for controlling charging of a contact-less chargeable battery using a contact-less charging device by means of electromagnetic induction phenomenon, which includes the steps of: intermittently applying a high frequency AC current to a primary coil provided to the charging device so as to intermittently generate a magnetic field in an outer region; linking a magnetic flux of the generated magnetic filed to a secondary coil provided to the battery so as to intermittently output an electromagnetically-induced high frequency AC current; rectifying the output high frequency AC current to be converted into a DC current; applying the DC current to a battery cell through a constant voltage/constant current element so as to charge the battery cell in a constant voltage/constant current mode; monitoring voltages at both ends of the constant voltage/constant current element and transmitting a monitoring result to the charging device by means of wire less communication while a high frequency AC current is not induced in the secondary coil; and adjusting a power of the high frequency AC current applied to the primary coil according to the transmitted monitoring result.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 3:
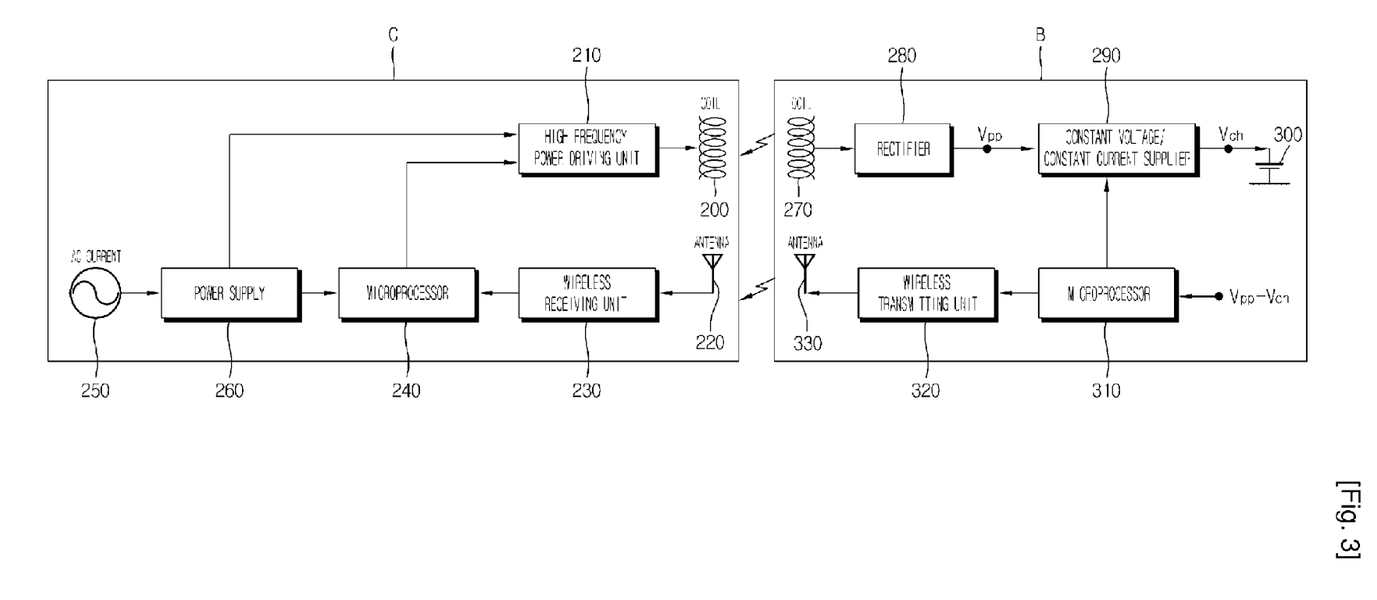
FIG. 3 is a schematic block diagram showing contact-less chargeable battery and charging device according to a preferred embodiment of the present invention.

FIG. 3 is a schematic block diagram showing a contact-less charging device C and a contact-less chargeable battery B according to a preferred embodiment of the present invention.

Referring to FIG. 3, the contact-less charging device C of this embodiment includes a primary coil 200, a high frequency power driving unit 210, a primary antenna 220, a wireless receiving unit 230, a microprocessor 240, and a power supply 260.

The high frequency power driving unit 210 applies a high frequency AC current of several tens KHz to the primary coil 200 by means of rapid switching operation to generate a magnetic field. For example, the high frequency power driving unit 210 applies a high frequency AC current of 80 KHz to the primary coil 200. If a magnetic field is generated to the primary coil 200 by the high frequency AC current, a charging power is transferred to the chargeable battery B in a contact-less method by means of electromagnetic induction phenomenon.

Preferably, the high frequency power driving unit 210 employs a known SMPS (Switching Mode Power Supply), but not limitedly.

The wireless receiving unit 230 receives an adjustment request signal of charging power transmitted from the chargeable battery B through the antenna 220, and then inputs the signal to the microprocessor 240.

The adjustment request signal is transmitted when an excessive charging power is transferred to the battery to probably cause a damage on circuit parts that supply constant voltage/constant current. The adjustment request signal is modulated and transmitted from the chargeable battery B, and thus the wireless receiving unit 230 demodulates the adjustment request signal and than inputs it to the microprocessor 240.

Preferably, a carrier in a frequency band of 10 to 15 MHz is used for wireless transmission of the adjustment request signal. In addition, the wireless receiving unit 230 is configured using a photo coupler. However, the present invention is not limited to such frequency band of the carrier and such elements for configuring the wireless receiving unit 230.

When the adjustment request signal is wirelessly transmitted from the chargeable battery B, it is preferred that a high frequency AC current is not applied to the primary coil 200. If an adjustment request signal is wirelessly transmitted while a magnetic field is generated in the primary coil 200 due to the application of a high frequency AC current in several tens KHz band, the adjustment request signal may be screened due to the magnetic field and thus the adjustment request signal may not be properly received through the wireless receiving unit 230.

Thus, the high frequency power driving unit 210 periodically has suspension times, not applying the high frequency AC current continuously to the primary coil 200. For example, the high frequency power driving unit 210 does not apply a high frequency AC current to the primary coil 200 for 50 ms whenever 3 seconds passes while transmitting a charging power to the chargeable battery B. In this case, the adjustment request signal is wirelessly transmitted within 30 ms when a high frequency AC current is not applied to the primary coil 200.

The microprocessor 240 controls the whole operation of the charging device C, and particularly it controls the high frequency power driving unit 210 to adjust a power of the high frequency AC current applied to the primary coil 200 if an adjustment request signal of the charging power is received from the wireless receiving unit 230.

Preferably, the microprocessor 240 controls the high frequency power driving unit 210 for high frequency pulse width modulation, pulse frequency modulation, pulse number modulation, or pulse amplitude modulation so as to adjust the power of the high frequency AC current. Then, a level of the charging power transmitted to the chargeable battery B is adjusted to prevent any damage of circuits in the chargeable battery B.

The power supply 260 receives a common AC current 250, then converts it into a DC current, and then supplies an operating power to the high frequency power driving unit 210 and the microprocessor 240.

The contact-less chargeable battery B of this embodiment includes a charging circuit module composed of a secondary coil 270, a rectifier 280, a constant voltage/constant current supplier 290, a microprocessor 310, a wireless transmitting unit 320 and an antenna 330, and a battery cell 300 that is charged by the charging circuit module.

The secondary coil 270 generates a high frequency AC current by means of electromagnetic induction phenomenon while a high frequency AC current is applied to the primary coil 200 provided to the charging device C. At this time, the high frequency AC current induced to the secondary coil 270 has an intensity proportional to a magnetic flux linked to the secondary coil 270.

The rectifier 280 smoothes the high frequency AC current induced to the secondary coil 270 to convert it into a DC current.

The constant voltage/constant current supplier 290 applies the rectified DC current to the battery cell 300 according to the control of the microprocessor 310 so as to charge the battery cell 300. At this time, the constant voltage/constant current supplier 290 charges the battery cell 300 in a constant current mode at an initial charging stage, but, if a charging voltage exceeds a predetermined criterion, the constant voltage/constant current supplier 290 charges the battery cell 300 in a constant voltage mode, which keeps a charging voltage constantly instead of decreasing a current.

The microprocessor 310 controls the constant voltage/constant current supplier 290 to charge the battery cell 300, monitors whether an excessive voltage is applied to both ends of the constant voltage/constant current supplier 290, and outputs an adjustment request signal of the charging power to the wireless transmitting unit 320 if an excessive voltage is applied.

Preferably, the operation of monitoring voltages at both ends of the constant voltage/constant current supplier 290 is conducted in a way of measuring a front end voltage $V_{pp}$ and a rear end voltage $V_{ch}$ of the constant voltage/constant current supplier 290 and then checks whether a difference between them exceeds a criterion value.

The wireless transmitting unit 320 receives the adjustment request signal of the charging power output from the microprocessor 310, and then modulates the adjustment request signal and wirelessly transmits it to the antenna 220 of the wireless receiving unit 230 provided to the charging device C through the antenna 330. At this time, a carrier of 10 to 15 MHz is used, and the wireless transmitting unit 320 is realized using a photo coupler, like the wireless receiving unit 230.

If the adjustment request signal is transmitted to the charging device C, a power of the high frequency AC current output through the high frequency power driving unit 210 is reduced according to the control of the microprocessor 240. As a result, a power of the high frequency AC current induced to the secondary coil 270 by means of electronic induction phenomenon is decreased. Accordingly, a voltage applied to both ends of the constant voltage/constant current supplier 290 is also decreased. Preferably, the feedback control for the power of the high frequency AC current applied to the primary coil 200 is continued until an overcurrent is not applied to both ends of the constant voltage/constant current supplier 290.

Figure 4:
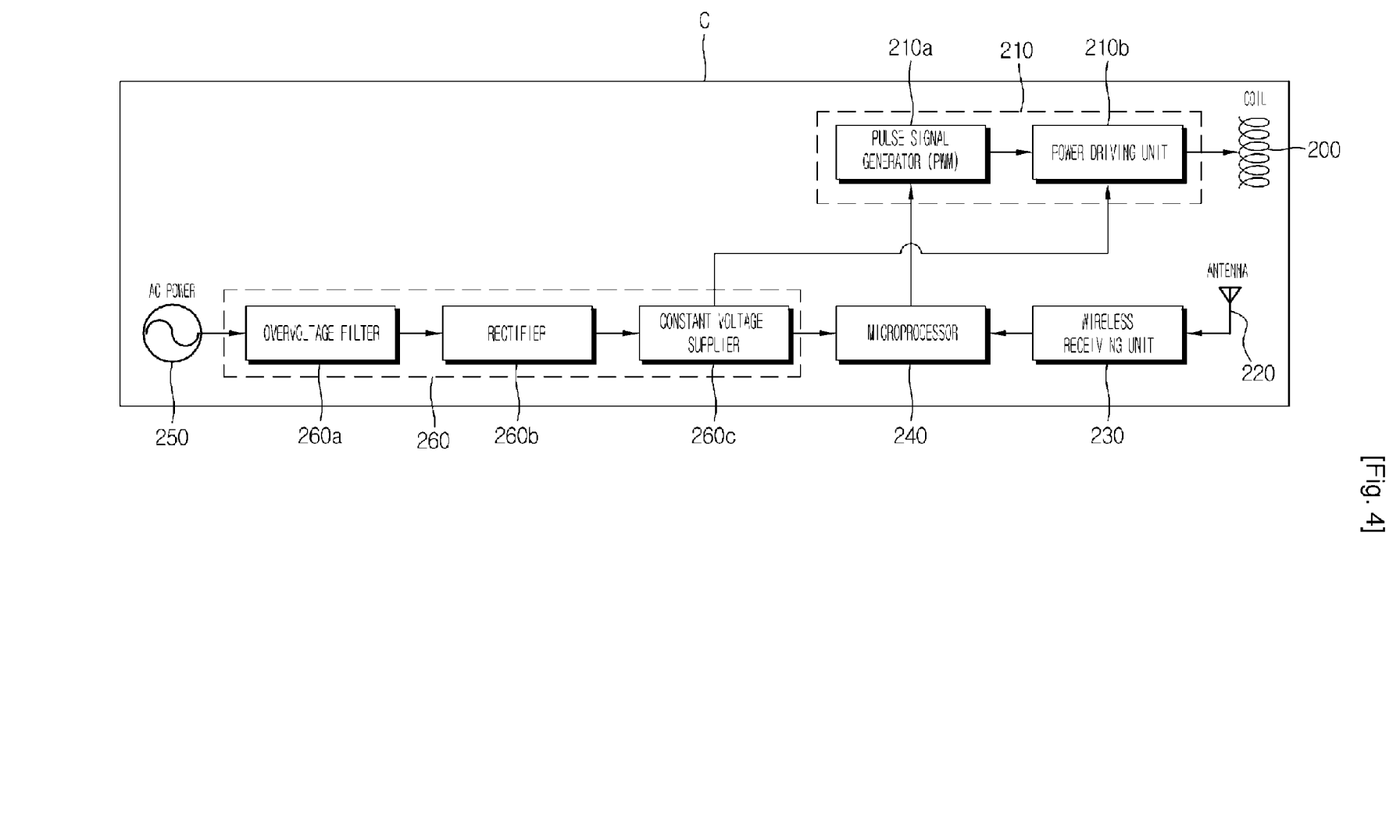
FIG. 4 is a detailed block diagram showing the contact-less charging device of FIG. 3.

FIG. 4 is a block diagram showing the contact-less charging device C according to the embodiment of the present invention in more detail.

Referring to FIG. 4, the power supply 260 includes an overvoltage filter 260a for intercepting an overvoltage applied from the common AC power source 250, a rectifier 260b for converting an AC current passing through the overvoltage filter 260a into a DC current, and a constant voltage supplier 260c for receiving the rectified DC current and supplying a constant voltage DC current to the microprocessor 240 and the high frequency power driving unit 210.

The high frequency power driving unit 210 includes a pulse signal generator 210a for receiving a pulse driving signal from the microprocessor 240 to generate a pulse signal, and a power driving part 210b for rapidly switching a constant voltage DC current input from the constant voltage supplier 260c using the pulse signal output from the pulse signal generator 210a to generate a high frequency AC current and then applying the high frequency AC current to the primary coil 200.

Figure 5:
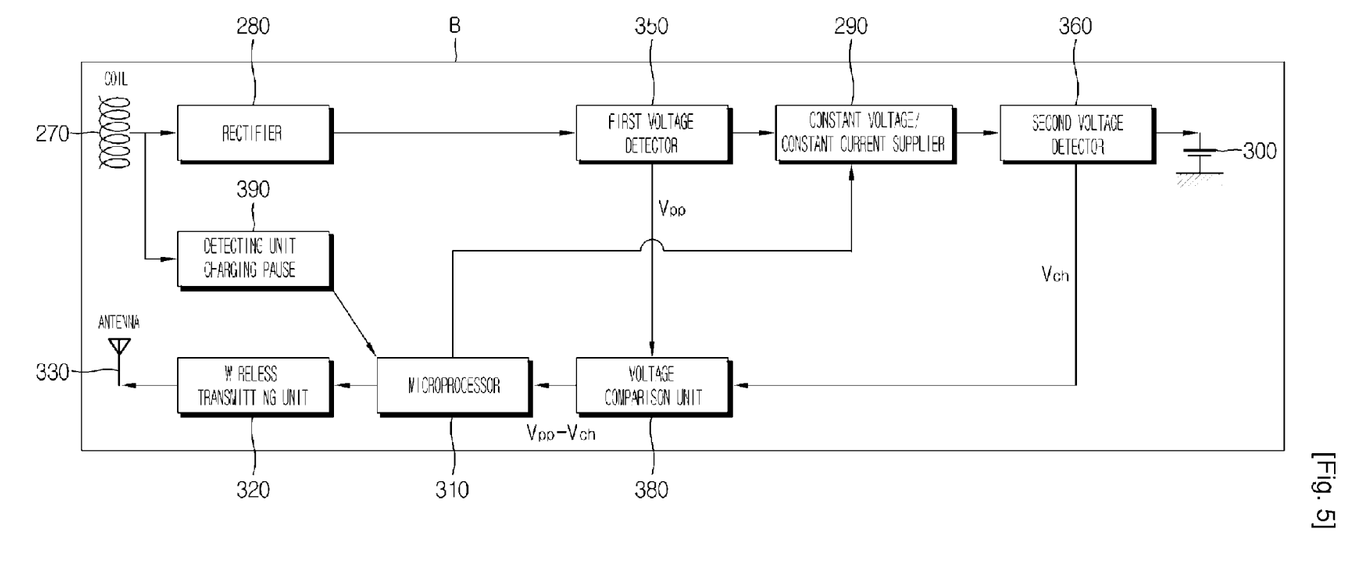
FIG. 5 is a detailed block diagram showing the contact-less battery of FIG. 3.

FIG. 5 is a block diagram showing the contact-less chargeable battery B according to the embodiment of the present invention in more detail.

Referring to FIG. 5, the contact-less chargeable battery B of this embodiment further includes a first voltage detector 350 and a second voltage detector 360 respectively provided to front and rear ends of the constant voltage/constant current supplier 290 to monitor whether an overvoltage is applied to both ends of the constant voltage/constant current supplier 290, and a voltage comparator 380 for inputting a comparison result of a first voltage $V_{pp}$ and a second voltage $V_{ch}$ respectively measured by the first and second voltage detectors 350, 360 to the microprocessor 310.

The voltage comparison result is a difference value of the first and second voltages, or a state of voltages at both ends, which indicates whether an overvoltage is applied. In the later case, the voltage comparator 380 compares a reference voltage difference for an overvoltage state with a difference between the first and second voltages.

Meanwhile, if it is determined that an overvoltage is applied after monitoring voltages at both ends of the constant voltage/constant current supplier 290, the microprocessor 310 uses the wireless transmitting unit 320 to transfer an adjustment request signal of the charging power to the charging device C in wireless.

However, if the adjustment request signal is wirelessly propagated while a charging power is transmitted from the primary coil 200 of the charging device C to the secondary coil 270 of the battery B, the adjustment request signal is screened by the magnetic field generated from the primary coil 200.

Thus, in order to solve the above problem, when a charging power is transmitted from the charging device C to the battery B, the transmission of charging power is temporarily interrupted in a regular cycle.

Figure 6:
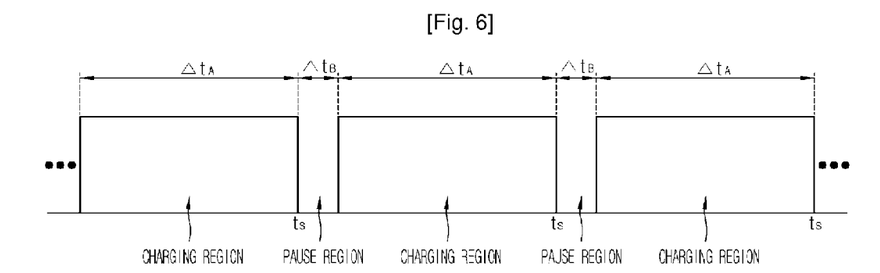
FIG. 6 is a graph showing that a charging power is intermittently output from a secondary coil of the contact-less chargeable battery.

That is to say, as shown in FIG. 6, a charging region $\Delta t_A$ in which a high frequency AC current is induced to the secondary coil 270 by means of electromagnetic induction phenomenon to charge electricity, and a pause region $\Delta t_B$ in which application of high frequency AC current to the primary coil 200 is intentionally intercepted to pause charging are periodically repeated. In addition, while the induction of high frequency AC current in the secondary coil 270 is interrupted to pause charging, an adjustment request signal of charging power is transmitted to the charging device C.

For this purpose, the battery B of this embodiment includes a charging pause detection unit 390 for receiving the high frequency AC current induced in the secondary coil 270 and detecting a time point $t_s$ (see FIG. 6) when the charging region ends.

The charging pause detection unit 390 detects the end time point $t_s$ (see FIG. 6) of the charging region and then inputs it to the microprocessor 310. Then, the microprocessor 310 wirelessly transmits an adjustment request signal for adjusting the charging power to the charging device C through the wireless transmitting unit 320 while the charging power is not transferred. Thus, it is possible to prevent the adjustment request signal of the charging power is screened due to the magnetic field generated by the primary coil 200.

If the adjustment request signal of the charging power is wirelessly transmitted to the charging device C, the power of high frequency AC current applied to the primary coil 200 is controlled by means of the feedback control mentioned above, so voltages at both ends of the constant voltage/constant current supplier 290 may be controlled to a suitable level.

The contact-less charging device and chargeable battery according to the present invention as described above reduce a charging power in real time by means of the feedback control though an overvoltage is applied to both ends of the constant voltage/constant current supplier 290, thereby capable of instantly solving the overvoltage state.

Figure 7:
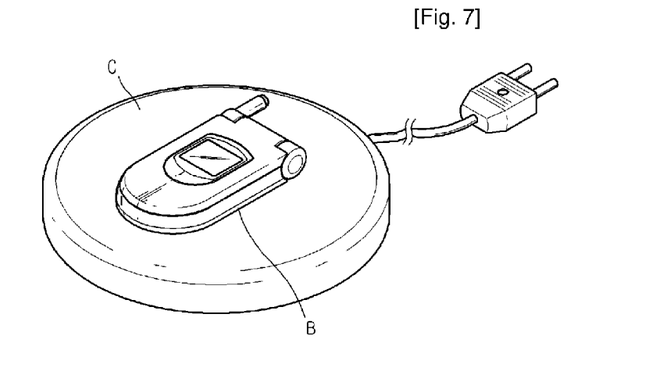
FIG. 7 shows a use state of the contact-less chargeable battery and charging device according to the present invention.

Thus, the contact-less charging device and chargeable battery of the present invention need not be fixed to a certain relative position as in the prior art so as to constantly keep an intensity of magnetic flux linked to the secondary coil 270. In addition, since the charging device C is designed in a pad shape as shown in FIG. 7, a user may conveniently charge a battery just by placing a subject such as a cellular phone coupled with a battery B onto a predetermined position of the pad, thereby allowing to make a convenient charger and battery set.

Hereinafter, a contact-less charging control method according to the present invention will be described in detail with reference to FIGS. 4 and 5.

First, in case of a non-charging mode, the high frequency power driving unit 210 of the charging device C applies a high frequency AC current to the primary coil 200 at regular time intervals according to the control of the microprocessor 240. For example, a high frequency AC current of 80 KHz is applied for 50 ms at 1 second intervals. Then, the primary coil 200 forms a magnetic field around it whenever a high frequency AC current is applied thereto.

A user places the battery B on the charging device C for the purpose of charging the battery B. After the battery B is positioned, if a high frequency AC current is applied to the primary coil 200 of the charging device C for a predetermined time, a magnetic field is generated to the primary coil 200, and as a result a magnetic flux is linked to the secondary coil 270 of the battery B. Accordingly, a high frequency AC current is induced to the secondary coil 270 for a predetermined time, and then the induction of high frequency AC current is temporarily intercepted due to disappearance of the magnetic if the high frequency AC current is not applied to the primary coil 200.

Meanwhile, the charging pause detection unit 390 detects a time point when the induction of high frequency AC current is temporarily intercepted, and then inputs it to the microprocessor 310. In response to that, the microprocessor 310 outputs a response signal to the wireless transmitting unit 320. Here, the response signal is a signal used for informing the microprocessor 240 of the charging device C that the secondary coil 270 provided to the battery B is coupled with the magnetic field generated by the primary coil 200 of the charging device C. If the response signal is output to the wireless transmitting unit 320, the wireless transmitting unit 320 modulates the response signal and then wirelessly transmits it to the charging device C through the antenna 330.

If the response signal is wirelessly transmitted, the wireless receiving unit 230 of the charging device C demodulates the response signal and then inputs it to the microprocessor 240. Then, the microprocessor 240 starts transferring a charging power to the battery B. That is to say, the microprocessor 240 controls the high frequency power driving unit 210 to repeat operations of applying a high frequency AC current to the primary coil 200 at predetermined time intervals and pausing application of the high frequency AC current for a predetermined time. For example, a high frequency AC current of 80 KHz is applied for 3 seconds and then this application is paused for 50 ms.

While the high frequency AC current is applied to the primary coil 200, a high frequency AC current is induced to the secondary coil 270 of the battery due to the electromagnetic induction phenomenon. The time during which high frequency AC current keeps induced as mentioned above is substantially identical to the dime during which the high frequency AC current keeps applied to the primary coil 200.

The high frequency AC current induced to the secondary coil 270 is converted into a DC current by the rectifier 280, and then applied to the battery cell 300 via the constant voltage/constant current supplier 290. Then, as the battery cell 300 is gradually charged, voltages at both ends of the battery cell 300 are raised till a full-charging state.

The microprocessor 310 controls the constant voltage/constant current supplier 290 to charge the battery cell 300 in a constant current mode until a charging voltage of the battery cell is increased to a certain level and also charge the battery cell 300 in a constant voltage mode if a voltage of the battery cell 300 is increased over a predetermined level.

Meanwhile, if the high frequency AC current applied to the primary coil 200 is paused, the induction of high frequency AC current in the secondary coil 270 is also temporarily intercepted, and this the charging process is temporarily stopped. Then, the charging pause detection unit 390 detects a time point when the induction of high frequency AC current is intercepted, and then inputs it to the microprocessor 310. This process is repeated whenever it comes to time points when the induction of high frequency AC current is temporarily intercepted.

Separately from the charging process of the battery cell 300 as mentioned above, the microprocessor 310 monitors whether an overvoltage is applied to both ends of the constant voltage/constant current supplier 290.

For this purpose, the voltage comparator 380 periodically receives voltages measured by the first and second voltage detectors 350, 360 respectively provided to the front and rear ends of the constant voltage/constant current supplier 290 to compare the voltages with each other, and then inputs a voltage comparison result to the microprocessor 310. Here, the voltage comparison result is a voltage state signal indicating a difference value of both measured voltages or indicating whether or not in an overvoltage state.

The microprocessor 310 receives the voltage comparison result from the voltage comparator 380 and then determines whether an overvoltage is applied to both ends of the constant voltage/constant current supplier 290.

As a result, if it is determined that an overvoltage is applied to both ends of the constant voltage/constant current supplier 290, the microprocessor 310 refers to the time point when the induction of high frequency AC current is temporarily intercepted, which is input by the charging pause detection unit 390, so as to determine whether or not a pause period at which a high frequency AC current is not currently applied to the primary coil.

As a result, if it is determined as a pause period, the microprocessor 310 outputs an adjustment request signal of charging power to the wireless transmitting unit 320. Then, the wireless transmitting unit 320 modulates the adjustment request signal of charging power and then wirelessly transmits it to the charging device C through the antenna 330.

In response to that, the wireless receiving unit 230 provided to the charging device C receives and demodulates the adjustment request signal of the charging power through the antenna 220, and then inputs it to the microprocessor 240. Then, the microprocessor 240 controls the high frequency power driving unit 210 to lower the power of the high frequency AC current applied to the primary coil 200 as much as a predetermined level.

If the power of the high frequency AC current applied to the primary coil 200 is decreased as mentioned above, the power of high frequency AC current induced to the secondary coil 270 by means of the electromagnetic induction phenomenon is also decreased.

Meanwhile, separately from the feedback control for the power of high frequency AC current, the microprocessor 310 periodically repeats monitoring an overvoltage state at both ends of the constant voltage/constant current supplier 290. As a result, if it is determined that an overvoltage state at both ends of the constant voltage/constant current supplier 290 is not yet solved through the first feedback control, the microprocessor 310 wirelessly transmits an adjustment request signal of charging power to the charging device C again so that the power of high frequency AC current applied to the primary coil 200 is lowered as much as a predetermined level once again. This process is continued until an overvoltage is not applied to both ends of the constant voltage/constant current supplier 290 through the feedback control.

A voltage difference at both ends of the constant voltage/constant current supplier 290 is kept in a suitable level through the above feedback control, so it is possible to prevent the constant voltage/constant current supplier 290 from being damaged due to an overvoltage while the battery B is charged in a contact-less method.

In the above embodiment, in order to prevent an overvoltage from being applied to both ends of the constant voltage/constant current supplier 290 of the contact-less chargeable battery B, the microprocessor 310 of the battery B monitors voltages measured at both ends of the constant voltage/constant current supplier 290 to directly check whether or not in an overvoltage state. In addition, if in an overvoltage state, the microprocessor 310 of the battery B transmits a charging power adjustment request signal to the microprocessor 240 of the charging device C by means of wireless communication. Then, the microprocessor 240 of the charging device C adjusts a power of the high frequency AC current applied to the primary coil 200 on the condition of receipt of the charging power adjustment request signal.

However, there may be another alternative. Specifically, referring to FIGS. 4 and 5, the microprocessor 310 of the battery B periodically monitors voltages at both ends of the constant voltage/constant current supplier 290 to obtain a voltage state.

Here, the voltage state is voltages at both ends of the constant voltage/constant current supplier 290, or a difference of the voltages. This voltage state may be input from the voltage comparator 380, or obtained by operating measured voltages $V_{pp}$, $V_{ch}$ input from the first and second voltage detectors 340, 360.

The microprocessor 340 of the battery B refers to a time point when the charging pause detection unit 390 inputs a signal whenever a voltage state is obtained, and then transmits a voltage state of both ends of the constant voltage/constant current supplier 290 to the microprocessor 240 of the charging device C by means of wireless communication while a high frequency AC current is not induced to the secondary coil 270.

Then, whenever receiving a voltage state, the microprocessor 240 of the charging device C checks whether the voltage state is in an overvoltage state. This checking process is realized in a way of examining whether a difference of voltages at both ends of the constant voltage/constant current supplier 290 exceeds a predetermined reference value.

As a result, if the voltage state of both ends of the constant voltage/constant current supplier 290 corresponds to an overvoltage state, the high frequency power driving unit 210 is controlled to adjust a power of high frequency AC current applied to the primary coil 200, thereby adjusting a charging current transmitted to the battery B.

If a required number of such charging current adjustment processes are repeated, though an overvoltage is applied to both ends of the constant voltage/constant current supplier 290, the overvoltage state may be solved within a short time, thereby preventing the constant voltage/constant current supplier 290 from being damaged.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, though an overvoltage is applied to both ends of the constant voltage/constant current supplier during the contact-less battery charging process, a charging power is adjusted in real time by means of the wireless feedback control, so it is possible to prevent the constant voltage/constant current supplier from being damaged due to the overvoltage applied to both ends thereof.

Accordingly, a limitation of relatively positions between a charging device and a battery adopting the contact-less charging method, and as a result the convenience of a user may be maximized.

The invention claimed is:

1. A contact-less chargeable battery including a charging circuit for charging an electric energy to a battery cell, the contact-less chargeable battery comprising:

a high frequency AC current inducing unit to which a high frequency AC current is induced by means of a magnetic field generated from an external contact-less charging device;

a rectifier for receiving the induced high frequency AC current and converting the induced high frequency AC current into a DC current;

a constant voltage/constant current supplier for receiving the DC current from the rectifier and supplying a charging power to the battery cell in a constant voltage/constant current mode; and an overvoltage monitoring unit for monitoring voltages at both ends of the constant voltage/constant current supplier and transmitting a monitoring result to the external contact-less charging device by means of wireless communication so as to induce a change of intensity of the magnetic field.

2. The contact-less chargeable battery according to claim 1, wherein the high frequency AC current inducing unit is a coil to which a magnetic flux of a magnetic field generated from the external contact-less charging device is linked.

3. The contact-less chargeable battery according to claim 1, wherein the overvoltage monitoring unit includes:
a wireless transmitting unit for wirelessly propagating the monitoring result through an antenna;
first and second voltage detectors for respectively detecting voltages at front and rear ends of the constant voltage/constant current supplier;
a voltage comparator for comparing first and second voltages detected by the first and second voltage detectors and outputs a voltage comparison result; and
a microprocessor for outputting a monitoring result according to the voltage comparison result to the wireless transmitting unit.

4. The contact-less chargeable battery according to claim 3, wherein a magnetic field generated by the contact-less charging device is generated intermittently,
wherein the overvoltage monitoring unit further includes a charging pause detecting unit for receiving the high frequency AC current output from the high frequency AC current inducing unit to detect a time point when the induction of high frequency AC current ends, and then outputting the end time point to the microprocessor, and
wherein the monitoring result is transmitted to the external contact-less charging device by means of wireless communication while a high frequency AC current is not induced after the end time point is input.

5. The contact-less chargeable battery according to claim 1, wherein the monitoring result is a charging power adjustment request signal.

6. The contact-less chargeable battery according to claim 1, wherein the monitoring result is a difference of voltages at both ends of the constant voltage/constant current supplier, voltage values of both ends, or a code indicating that the voltages at both ends are in an overvoltage state.

7. A contact-less charging circuit module electrically connected to a battery cell and used for charging an electric energy to the battery cell in a contact-less method, the contact-less charging circuit module comprising:
a high frequency AC current inducing unit to which a high frequency AC current is induced by means of a magnetic field generated from an external contact-less charging device;
a rectifier for receiving the induced high frequency AC current and converting the induced high frequency AC current into a DC current;
a constant voltage/constant current supplier for receiving the DC current from the rectifier and supplying a charging power to the battery cell in a constant voltage/constant current mode; and
an overvoltage monitoring unit for monitoring voltages at both ends of the constant voltage/constant current supplier and transmitting a monitoring result to the external contact-less charging device by means of wireless communication so as to induce a change of intensity of the magnetic field.

8. The contact-less charging circuit module according to claim 7,
wherein the high frequency AC current inducing unit is a coil to which a magnetic flux of a magnetic field generated from the external contact-less charging device is linked.

9. The contact-less charging circuit module according to claim 7, wherein the overvoltage monitoring unit includes:
a wireless transmitting unit for wirelessly propagating the monitoring result through an antenna;
first and second voltage detectors for respectively detecting voltages at front and rear ends of the constant voltage/constant current supplier;
a voltage comparator for comparing first and second voltages detected by the first and second voltage detectors and outputs a voltage comparison result; and
a microprocessor for outputting a monitoring result according to the voltage comparison result to the wireless transmitting unit.

10. The contact-less charging circuit module according to claim 9,
wherein a magnetic field generated by the contact-less charging device is generated intermittently,
wherein the overvoltage monitoring unit further includes a charging pause detecting unit for receiving the high frequency AC current output from the high frequency AC current inducing unit to detect a time point when the induction of high frequency AC current ends, and then outputting the end time point to the microprocessor, and
wherein the monitoring result is transmitted to the external contact-less charging device by means of wireless communication while a high frequency AC current is not induced after the end time point is input.

11. The contact-less charging circuit module according to claim 1, wherein the monitoring result is a charging power adjustment request signal.

12. The contact-less charging circuit module according to claim 1, wherein the monitoring result is a difference of voltages at front and rear ends of the constant voltage/constant current supplier, voltage values of the front and rear ends, or a code indicating that the voltages at both ends are in an overvoltage state.

13. A contact-less charging device for transmitting a charging power by means of electromagnetic induction phenomenon to a contact-less chargeable battery that has a constant-voltage/constant current supplier to be capable of being charged in a constant voltage/constant current mode and wirelessly transmits a monitoring result for voltages at both ends of the constant voltage/constant current supplier, the contact-less charging device comprising:
a magnetic field generating unit for receiving an AC current and forming a magnetic field in an outer space;
a high frequency power driving unit for applying a high frequency AC current to the magnetic field generating unit; and
a charging power adjusting unit for receiving the monitoring result from the contact-less chargeable battery by means of wireless communication and controlling the high frequency power driving unit to adjust a power of the high frequency AC current applied to the magnetic field generating unit so that a charging power transmitted to the battery is adjusted.

14. The contact-less charging device according to claim 13, wherein the magnetic field generating unit is a coil to both sides of which a high frequency AC current is applied.

15. The contact-less charging device according to claim 13, wherein the charging power adjusting unit includes:
a wireless receiving unit for wirelessly receiving the monitoring result through an antenna; and
a microprocessor for receiving the monitoring result from the wireless receiving unit and controlling the high frequency power driving unit to adjust a power of the high frequency AC current applied to the magnetic field generating unit.

16. The contact-less chargeable battery according to claim 15, further comprising a constant voltage supplier for converting a common AC current, converting the common AC current into a DC current, and then supplying a constant-voltage current to the high frequency power driving unit, wherein the high frequency power driving unit includes:
a pulse signal generator for receiving a pulse driving signal from the microprocessor and outputting a pulse signal; and
a power driving part for receiving the pulse signal to rapidly switch the constant-voltage current input from the constant voltage supplier, thereby generating a high frequency AC current in a pulse pattern.

17. The contact-less charging device according to claim 16, wherein the charging power adjusting unit adjusts a charging power by modulating a width of a pulse current, a frequency of the pulse current, an amplitude of a pulse, or the number of pulses.

18. The contact-less charging device according to claim 16, wherein the constant voltage supplier includes:
an overvoltage filter for receiving a common AC current and intercepting an overvoltage current;
a rectifier for rectifying the AC current passing through the filter to convert the AC current into a DC current; and
a constant voltage supplying part for receiving the converted DC current and outputs a constant voltage current.

19. The contact-less charging device according to claim 13, wherein the high frequency power driving unit intermittently applies a high frequency AC current to the magnetic field generating unit, and
wherein the charging power adjusting unit receives the monitoring result while a high frequency AC current is not applied to the magnetic field generating unit.

20. The contact-less charging device according to claim 13, wherein the monitoring result is a difference of voltages at both ends of the constant voltage/constant current supplier, voltage values at both ends, a code indicating that the voltages at both ends are in an overvoltage state, or a charging power adjustment request signal.

21. A battery charging set including a contact-less chargeable battery and a contact-less charging device,
wherein the battery includes:
a high frequency AC current inducing unit to which a high frequency AC current is induced by means of a magnetic field intermittently generated from an external contact-less charging device;
a rectifier for receiving the induced high frequency AC current and converting the induced high frequency AC current into a DC current;
a constant voltage/constant current supplier for receiving the DC current from the rectifier and supplying a charging power to a battery cell in a constant voltage/constant current mode;
and an overvoltage monitoring unit for monitoring voltages at both ends of the constant voltage/constant current supplier and transmitting a monitoring result to the external contact-less charging device by means of wireless communication while a high frequency AC current is not induced,
wherein the charging device includes:
a magnetic field generating unit for receiving an AC current and forming a magnetic field in an outer space;
a high frequency power driving unit for intermittently applying a high frequency AC current to the magnetic field generating unit; and
a charging power adjusting unit for, while a high frequency AC current is not applied to the magnetic field generating unit, receiving the monitoring result by means of wireless communication and controlling the high frequency power driving unit to adjust a power of the high frequency AC current applied to the magnetic field generating unit so that a charging power transmitted to the battery is adjusted.

22. The battery charging set according to claim 21, wherein the monitoring result is a difference of voltages at both ends of the constant voltage/constant current supplier, voltage values at both ends, a code indicating that the voltages at both ends are in an overvoltage state, or a charging power adjustment request signal.

23. A method for controlling charging of a contact-less chargeable battery using a contact-less charging device by means of electromagnetic induction phenomenon, the method comprising:
(a) intermittently applying a high frequency AC current to a primary coil provided to the charging device so as to intermittently generate a magnetic field in an outer region;
(b) linking a magnetic flux of the generated magnetic filed to a secondary coil provided to the battery so as to intermittently output an electromagnetically-induced high frequency AC current;
(c) rectifying the output high frequency AC current to be converted into a DC current;
(d) applying the DC current to a battery cell through a constant voltage/constant current supplier so as to charge the battery cell in a constant voltage/constant current mode;
(e) monitoring voltages at both ends of the constant voltage/constant current supplier and transmitting a monitoring result to the charging device by means of wireless communication while a high frequency AC current is not induced in the secondary coil; and
(f) adjusting a power of the high frequency AC current applied to the primary coil according to the transmitted monitoring result.

24. The method according to claim 23, wherein the monitoring result is a difference of voltages at both ends of the constant voltage/constant current supplier, voltage values at both ends, a code indicating that the voltages at both ends are in an overvoltage state, or a charging power adjustment request signal.

* * * * *